(12) United States Patent
Wakayama et al.

(10) Patent No.: US 9,385,546 B2
(45) Date of Patent: Jul. 5, 2016

(54) TO-BE-CHARGED APPARATUS, CHARGING ADAPTER, ELECTRONIC APPARATUS SET, AND PLUG UNIT

(75) Inventors: Kikuo Wakayama, Saitama (JP); Tooru Okamura, Saitama (JP); Naotaka Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 13/565,232

(22) Filed: Aug. 2, 2012

(65) Prior Publication Data

US 2013/0057201 A1 Mar. 7, 2013

(30) Foreign Application Priority Data

Sep. 2, 2011 (JP) ................................. 2011-191791

(51) Int. Cl.
*H02J 7/00* (2006.01)
(52) U.S. Cl.
CPC ............. *H02J 7/0036* (2013.01); *H02J 7/0042* (2013.01); *H02J 2007/0062* (2013.01)
(58) Field of Classification Search
CPC ....................................................... H04M 1/04
USPC ........................ 381/380, 370; 320/106–107; 455/572–573, 575.2
See application file for complete search history.

(56) References Cited

U.S. PATENT DOCUMENTS

| | | | |
|---|---|---|---|
| 6,704,428 B1* | 3/2004 | Wurtz | 381/370 |
| 7,489,974 B2* | 2/2009 | Numano | 700/22 |
| 7,548,040 B2* | 6/2009 | Lee et al. | 320/108 |
| 7,909,651 B2* | 3/2011 | Kim et al. | 439/638 |
| 2004/0101744 A1* | 5/2004 | Suzuki | 429/61 |
| 2005/0003858 A1* | 1/2005 | Rodriguez et al. | 455/556.1 |
| 2005/0175210 A1* | 8/2005 | Yang | 381/371 |
| 2010/0320961 A1* | 12/2010 | Castillo et al. | 320/107 |

FOREIGN PATENT DOCUMENTS

JP 2008-259192 A 10/2008

* cited by examiner

*Primary Examiner* — Drew A Dunn
*Assistant Examiner* — Zixuan Zhou
(74) *Attorney, Agent, or Firm* — Chip Law Group (57) ABSTRACT

A to-be-charged apparatus, including: a built-in battery; a plug connectable to a jack included in a data storage apparatus capable of storing data and a jack included in a charging adapter; a drive unit that is capable of acquiring the data from the data storage apparatus while the plug is connected to the jack of the data storage apparatus and is driven by power supplied from the built-in battery; and a circuit that includes a data line for transmitting the data, which is connected between the plug and the drive unit, and supplies, when a connection of the plug to the jack of the charging adapter is detected by a detection switch included in the charging adapter connected to a power supply apparatus, a charge from the charging adapter to the built-in battery using the data line.

15 Claims, 8 Drawing Sheets

TO-BE-CHARGED APPARATUS, CHARGING ADAPTER, ELECTRONIC APPARATUS SET, AND PLUG UNIT

BACKGROUND

The present disclosure relates to a to-be-charged apparatus having a battery, a charging adapter used in charging the to-be-charged apparatus, an electronic apparatus set including the to-be-charged apparatus and the charging adapter, and a plug unit provided in the to-be-charged apparatus.

An earphone gender for a multimedia apparatus disclosed in Japanese Patent Application Laid-open No. 2008-259192 (hereinafter, referred to as Patent Document 1) includes a stem (6), a code (11), and a USB (Universal Serial Bus) connector (12) as shown in FIGS. 1, 2, and 14. A multimedia apparatus (100) is connectable to the stem (6), and earphones (200) are connectable to an audio socket (22) integrally provided to the USB connector (12). Such an apparatus enables the multimedia apparatus (100) to be connected to an external apparatus such as a PC (Personal Computer) via a path leading from the USB connector (12) to a dock connector (5), and thus charging and data transmissions with respect to the multimedia apparatus (100) become possible (see, for example, paragraph [0023] in specification of Patent Document 1).

SUMMARY

Incidentally, a chargeable device generally includes a charge-only jack in many cases, and a user may need to use a charge-only code when charging the device. From a user side, there is a desire to reduce the number of equipment requisite for charging.

In view of the circumstances as described above, there is a need for a to-be-charged apparatus, a charging adapter, a plug unit provided in the to-be-charged apparatus, and an electronic apparatus set that includes those above and has a reduced number of equipment requisite for charging.

According to an embodiment of the present disclosure, there is provided a to-be-charged apparatus including a built-in battery, a plug, a drive unit, and a circuit.

The plug is connectable to a jack included in a data storage apparatus capable of storing data and a jack included in a charging adapter.

The drive unit is capable of acquiring the data from the data storage apparatus while the plug is connected to the jack of the data storage apparatus and is driven by power supplied from the built-in battery.

The circuit includes a data line for transmitting the data, which is connected between the plug and the drive unit, and supplies, when a connection of the plug to the jack of the charging adapter is detected by a detection switch included in the charging adapter connected to a power supply apparatus, a charge from the charging adapter to the built-in battery using the data line.

Since the circuit that supplies a charge from the charging adapter to the built-in battery using the data line is provided, the number of equipment requisite for charging can be reduced as compared to general products of the related art.

The plug may be a 3-prong plug including a common electrode. With this structure, the present disclosure can be applied to a to-be-charged apparatus equipped with a speaker as follows, for example.

The drive unit may include a speaker and a noise cancel circuit connected to the speaker. In earphones and headphones of the related art that have been equipped with a noise cancel circuit, charging has been performed using a charge-only code different from a line for transmitting audio data. However, according to the embodiment of the present disclosure, the charge-only code becomes unnecessary.

The to-be-charged apparatus may further include a plug housing that includes a portion that mechanically makes a switch by the detection switch of the charging adapter and holds the plug. Since the plug housing mechanically makes a switch of the detection switch, the charging adapter or the to-be-charged apparatus can positively detect a connected or unconnected state of the plug to the jack.

The circuit may include a capacitor provided on the data line, a charge supply line that is branched from the data line and connected to the built-in battery, and a diode provided on the charge supply line. With this structure, the circuit can transmit data via the data line and supply a charge to the built-in battery using a part of the data line and the charge supply line. Moreover, the diode enables a backflow of charges from the charge supply line to the data line from occurring.

According to an embodiment of the present disclosure, there is provided a charging adapter that is connectable to a to-be-charged apparatus including a built-in battery, a plug, and a data line for transmitting data stored in a data storage apparatus connected to the plug and to a power supply apparatus and charges the to-be-charged apparatus, the charging adapter including a terminal, a jack, a detection switch, and a charging circuit.

The terminal is connectable to the power supply apparatus.

The jack is connectable to the plug of the to-be-charged apparatus.

The detection switch is configured to detect that the plug of the to-be-charged apparatus has been connected to the jack.

The charging circuit is connected to the terminal, the jack, and the detection switch and charges the built-in battery using the data line of the to-be-charged apparatus when the terminal is connected to the power supply apparatus and a connection of the plug to the jack is detected by the detection switch.

Since the charging circuit charges the built-in battery of the to-be-charged apparatus using the data line of the to-be-charged apparatus when a connection of the plug of the to-be-charged apparatus to the jack is detected by the detection switch, the number of equipment requisite for charging can be reduced as compared to general products of the related art.

The presupposition portion "a charging adapter that is connectable to a to-be-charged apparatus including a built-in battery . . ." has not been described in view of the related art, and the applicant of the present disclosure has given the description on the presupposition portion to help understand the content of the present disclosure.

The charging circuit may include a charging line connected between the terminal and the jack and a detection unit that detects a normality and an anomaly of a voltage of the charging line. Since the voltage of the charging line is monitored by the detection unit, even when the detection switch detects that a plug of a product different from the to-be-charged apparatus is connected to the jack, for example, the charging circuit can detect an anomaly caused by such a connection.

The detection switch may include a portion that mechanically makes a switch by a plug housing that is included in the to-be-charged apparatus and supports the plug.

According to an embodiment of the present disclosure, there is provided an electronic apparatus set including a charging adapter connectable to a power supply apparatus and a to-be-charged apparatus connectable to the charging adapter and a data storage apparatus capable of storing data.

The to-be-charged apparatus includes a built-in battery, a plug connectable to a jack included in the data storage apparatus and a jack included in the charging adapter, a drive unit that is capable of acquiring the data from the data storage apparatus while the plug is connected to the jack of the data storage apparatus and is driven by power supplied from the built-in battery, and a circuit that includes a data line for transmitting the data, which is connected between the plug and the drive unit, and is connected to the built-in battery.

The charging adapter includes a terminal connectable to the power supply apparatus, the jack, a detection switch that detects that the plug of the to-be-charged apparatus has been connected to the jack of the charging adapter, and a charging circuit that is connected to the terminal, the jack, and the detection switch and charges the built-in battery using the data line of the to-be-charged apparatus when the terminal is connected to the power supply apparatus and a connection of the plug to the jack is detected by the detection switch.

According to an embodiment of the present disclosure, there is provided a plug unit for a to-be-charged apparatus.

The to-be-charged apparatus includes a built-in battery, a data line for transmitting data from a data storage apparatus capable of storing the data, and a drive unit that is connected to the data line, is capable of acquiring the data from the data storage apparatus via the data line, and is driven by power supplied from the built-in battery.

The plug unit includes a plug and a plug housing.

The plug is connectable to a jack included in the data storage apparatus and a jack included in a charging adapter and is connected to the data line.

The plug housing supports the plug and includes a portion that mechanically makes a switch by a detection switch that is included in the charging adapter connected to a power supply apparatus and detects a connection of the plug to the jack.

Since the plug housing mechanically makes a switch of the detection switch, the charging adapter or the to-be-charged apparatus can positively recognize a connected or unconnected state of the plug to the jack.

According to an embodiment of the present disclosure, there is provided a to-be-charged apparatus including a mounting unit and the plug, drive unit, and circuit described above.

An external battery can be mounted to the mounting unit.

According to an embodiment of the present disclosure, there is provided a charging adapter that is connectable to a to-be-charged apparatus and a power supply apparatus and charges the to-be-charged apparatus. The to-be-charged apparatus includes a mounting unit to which an external battery is mounted, a plug, and a data line for transmitting data stored in a data storage apparatus connected to the plug.

The charging adapter includes the terminal, jack, detection switch, and charging circuit described above.

As described above, according to the embodiments of the present disclosure, the number of equipment requisite for charging can be reduced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

[Electronic Apparatus Set]

Figure 1A:
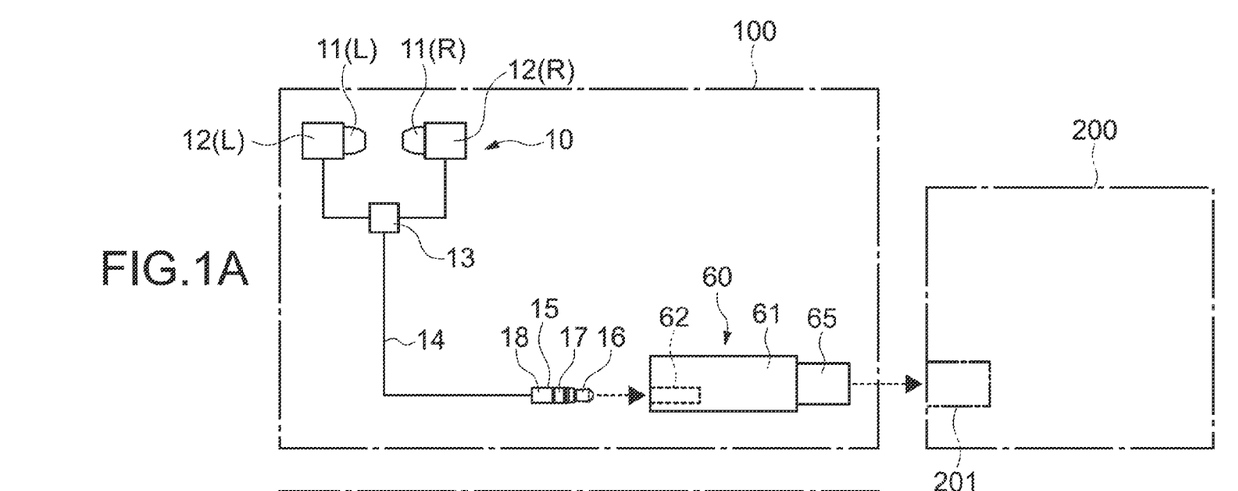
FIG. 1A is a schematic diagram mainly showing an electronic apparatus set according to an embodiment of the present disclosure.

FIG. 1A is a schematic diagram mainly showing an electronic apparatus set according to an embodiment of the present disclosure.

An electronic apparatus set 100 includes a charging adapter 60 and earphones 10 as a to-be-charged apparatus.

The charging adapter 60 includes a terminal 65. A USB (Universal Serial Bus) terminal is used as the terminal 65, for example, though other terminals may be used instead. As the USB terminal, well-known USB terminals having various shapes can be used. The charging adapter 60 includes a jack 62 to which a plug 15 of the earphones 10 is connectable.

The terminal 65 of the charging adapter 60 is connectable to a terminal 201 of a power supply apparatus 200 as an apparatus including a power supply. The power supply apparatus 200 is typically a PC (Personal Computer) or an AC (Alternate Current) adapter. The AC adapter is an apparatus connectable to a jack 62 of a household AC power supply. However, the power supply apparatus 200 may be any apparatus as long as it can supply power to the charging adapter 60.

The earphones 10 include a pair of left and right earphone bodies 12 (L, R) and piece portions 11 (L, R) and the plug 15 connectable to the jack 62 of the charging adapter 60. The earphones 10 also include a code 14 connected between the pair of earphone bodies 12 (L, R) and the plug 15 and a power supply switch 13 provided in the middle of the code 14. As will be described later, an MCU (Micro Control Unit) 30 mainly including a speaker 31, a microphone 32, and a noise cancel circuit is incorporated into the bodies 12 (L, R). In other words, the earphones 10 are so-called noise-canceller-attached earphones 10. The speaker 31, the microphone 32, the noise cancel circuit, and the like constitute a drive unit.

It should be noted that the noise cancel circuit used herein typically refers to a device obtained by combining a program stored in a memory of the MCU and hardware of the MCU, though the noise cancel circuit may be constituted of hardware alone.

Figure 1B:
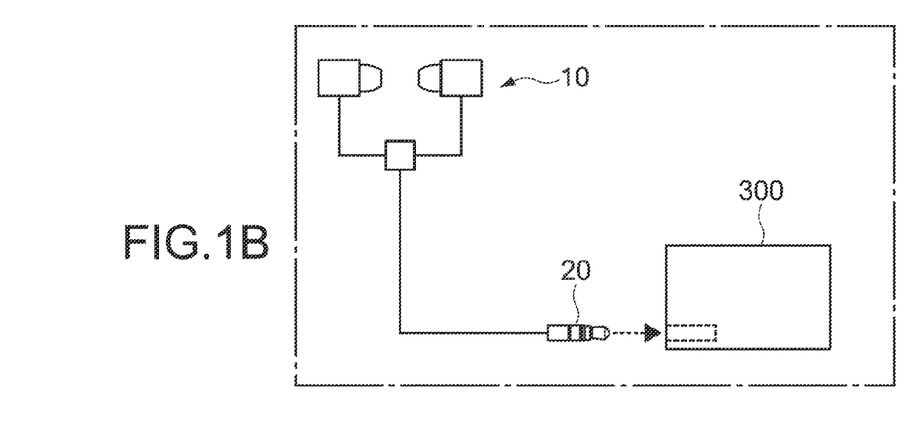
FIG. 1B is a schematic diagram showing a multimedia apparatus such as an audio player, to which earphones are connected.

FIG. 1B is a schematic diagram showing a multimedia apparatus 300 such as an audio player, to which the earphones 10 are connected.

The multimedia apparatus 300 is an apparatus capable of storing audio data such as a music file. The multimedia apparatus 300 functions as one of data storage apparatuses. Using the earphones 10, a user can listen to the audio data stored in the multimedia apparatus 300. The multimedia apparatus 300 is a cellular phone, a video player, or the like and may be any apparatus as long as the earphones 10 can be connected thereto.

Figure 2A:
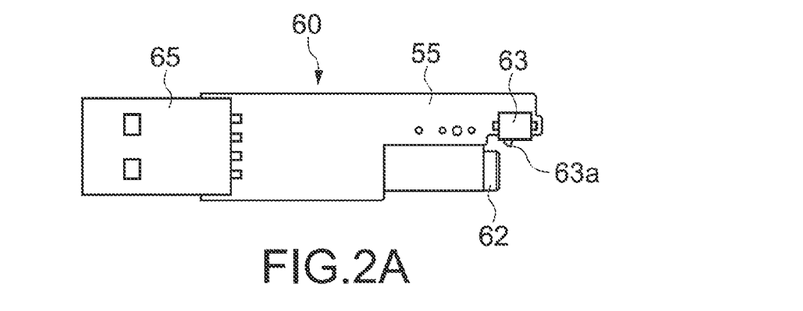
FIGS. 2A to 2D are diagrams for explaining a structure of a charging adapter and a connection of a plug to a jack of the charging adapter.

FIG. 2A is a diagram for explaining a structure of the charging adapter 60. To help understand the structure, FIG. 2A shows the charging adapter 60 in a state where an outer case 61 (see FIG. 1) of the charging adapter 60 is removed, that is, a state where the terminal 65, a circuit board 55, the jack 62, and the like are exposed (same holds true for FIGS. 2B to 2D). On the circuit board 55, a detection switch 63 is provided near the jack 62.

Figure 2B:
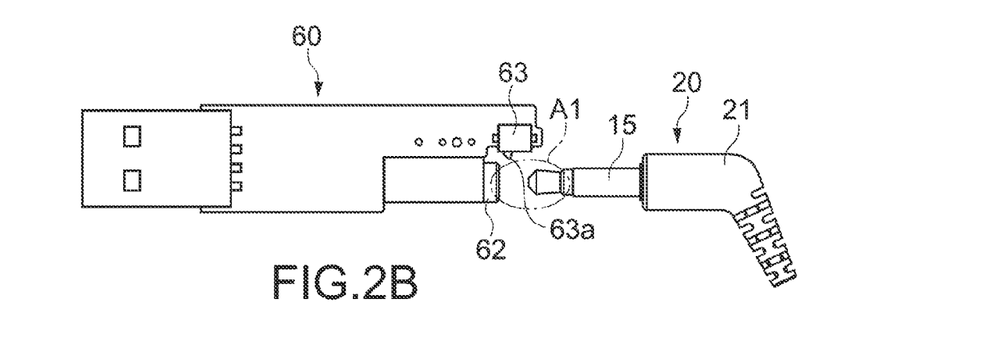
Figure 2C:
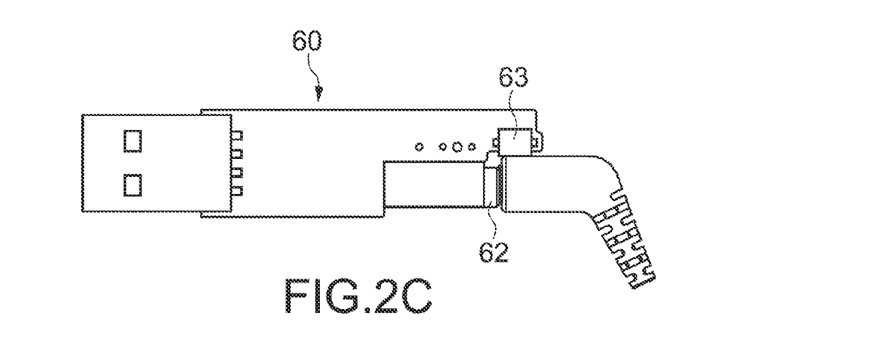

For example, the detection switch 63 is provided near an end portion of the jack 62 at a position facing an area A1 where the plug 15 (of plug unit 20) passes when the plug 15 is inserted or removed as shown in FIGS. 2B and 2C. The detection switch 63 includes a protrusion 63a that protrudes toward the area A1 where the plug 15 passes. The protrusion 63a exerts an elastic force by a spring (not shown) or the like and is exposed on the area A1 side when the plug 15 is not connected as shown in FIGS. 2A and 2B. By the protrusion 63a being pressed by a predetermined portion of a plug housing 21 of the plug unit 20 (to be described later) as shown in FIG. 2C, the detection switch 63 is turned on, and the charging adapter 60 detects that the plug 15 has been connected.

[Plug Unit]

Figure 3:
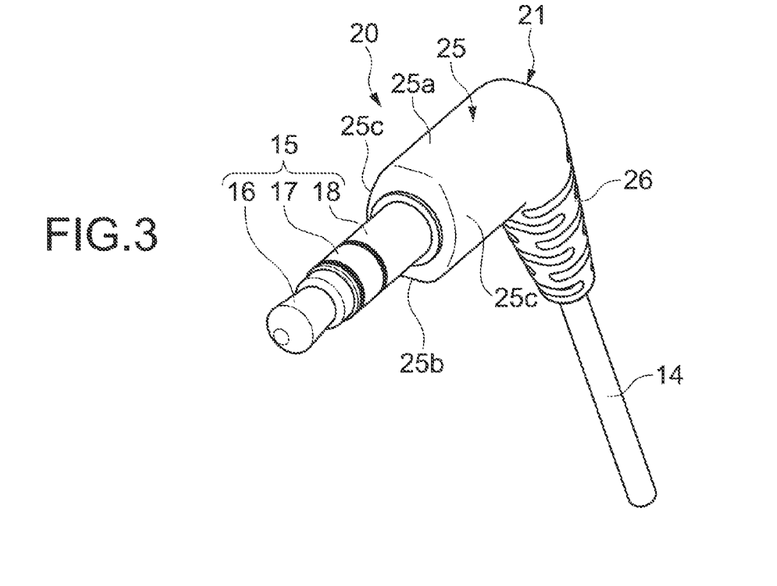
FIG. 3 is a perspective view of a plug unit of the earphones.
Figure 4:
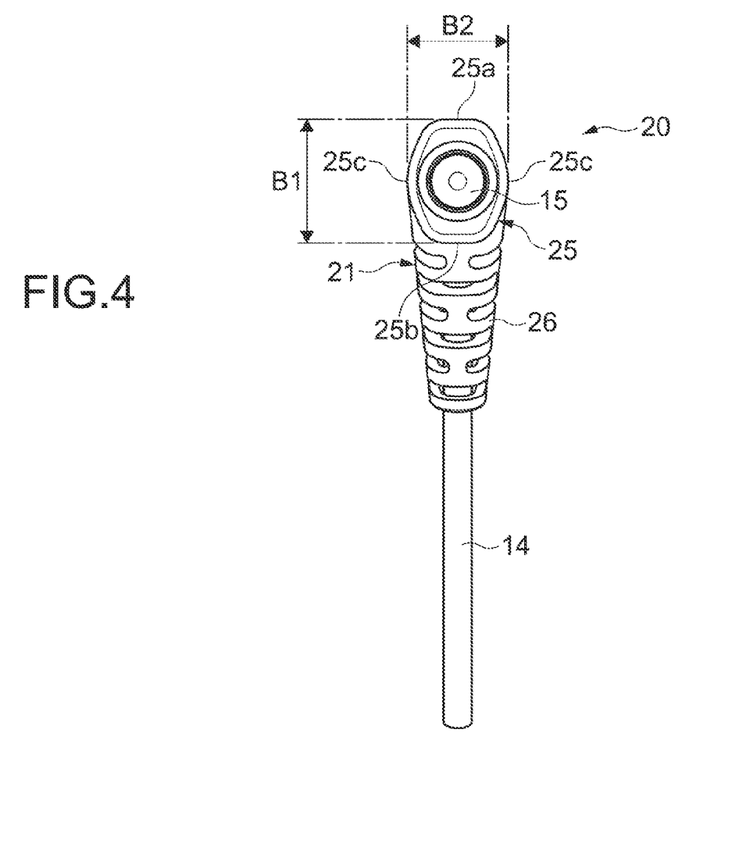
FIG. 4 is a front view of the plug unit shown in FIG. 3.

FIG. 3 is a perspective view of the plug unit 20, and FIG. 4 is a front view thereof.

The plug unit 20 includes the plug 15 and the plug housing 21 supporting the plug 15. The plug 15 is a 3-prong plug including electrodes for two channels (L-channel electrode 16 and R-channel electrode 17) and a common electrode 18. The plug 15 is a so-called stereo mini-plug and formed to have an outer diameter of 3.5 mm.

The plug housing 21 includes a body 25 and a flexible portion 26, and a surface of the body 25 includes an upper surface 25a, a lower surface 25b opposing the upper surface 25a, and side surfaces 25c connecting the upper surface 25a and the lower surface 25b. The side surfaces 25c are curved, though not particularly limited thereto. The upper surface 25a and the lower surface 25b are practically formed as a plane, for example. The code 14 extends from the flexible portion 26.

The plug housing 21 is formed such that the upper surface 25a of the plug housing 21 of the plug unit 20 can press the protrusion 63a in FIGS. 2B and 2C, and the arrangement of the jack 62 and the detection switch 63 is also set such that the upper surface 25a can press the protrusion 63a.

By providing the detection switch 63 that mechanically makes a switch as the protrusion 63a is pressed as described above, the charging adapter 60 can positively detect a connected or unconnected state of the plug 15 to the jack 62. In particular, by forming the upper surface 25a of the plug housing 21 as a plane, an area of the upper surface 25a that comes into contact with the protrusion 63a becomes larger. As a result, a degree of freedom of an angle of the plug unit 20 about an axis in a longitudinal direction of the plug 15, that is, a degree of freedom in a connection at a time the user connects the plug 15 to the jack 62 can be improved.

Figure 2D:
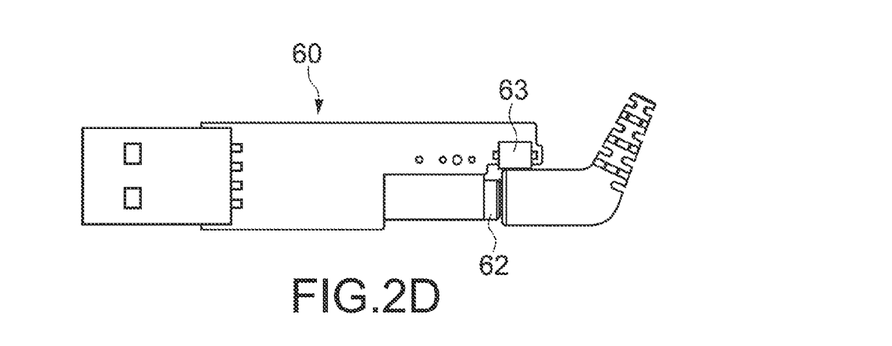

As shown in FIG. 4, a distance between the upper surface 25a and the lower surface 25b in the body 25 of the plug housing 21 when looking at the plug in an axial direction is represented by B1. The plug housing 21 is formed such that the distances from the center of the plug 15 to the upper surface 25a and the lower surface 25b (B1/2) shown in FIG. 4 become substantially the same. With this structure, the lower surface 25b can also press the detection switch 63 when the plug 15 is connected to the jack 62 as shown in FIG. 2D.

Particularly in this embodiment, the plug housing 21 is formed such that a relationship between the distance B1 and a distance B2 between the side surfaces 25c in a direction orthogonal to the direction along the distance B1 becomes B1>B2.

Due to such a unique shape of the plug housing 21 of the present disclosure, the detection switch 63 of the charging adapter 60 can be switched mechanically. For example, a housing of a plug unit having a mini-plug in general is circular when seen in an axial direction of the plug in many cases. A diameter of such a housing is as small as B2 shown in FIG. 4 in the axial direction and is mostly smaller than B1. Therefore, even when the general plug as described above is inserted into the jack 62 of the charging adapter 60, the housing does not come into contact with the protrusion 63a of the detection switch 63 or is incapable of making a switch even when being brought into contact therewith. Therefore, the detection switch 63 is prevented from being turned on in such a case.

[Circuit Structure of Charging Adapter]

Figure 5:
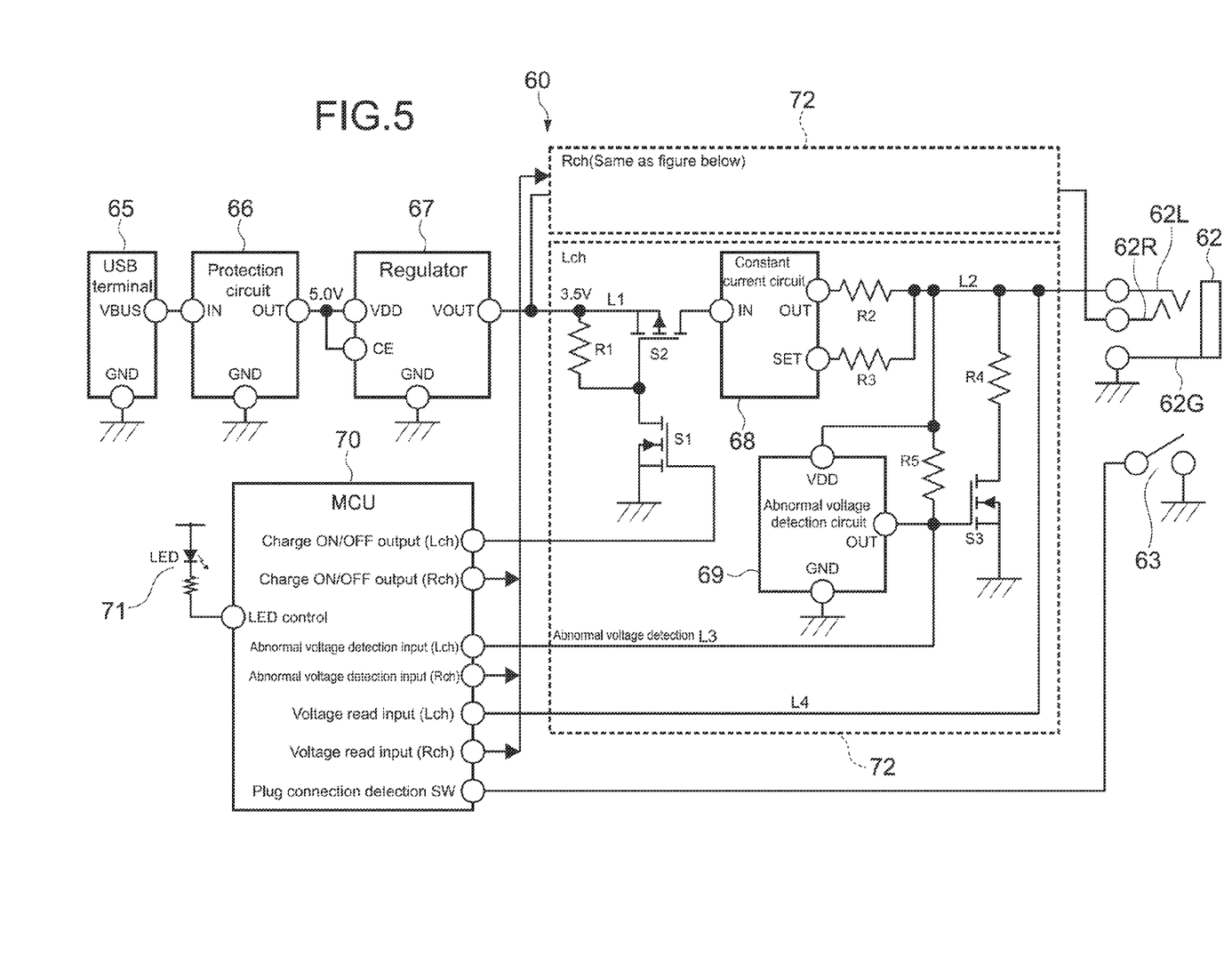
FIG. 5 is a diagram showing a circuit structure of the charging adapter.

FIG. 5 is a diagram showing a circuit structure of the charging adapter 60.

The charging adapter 60 includes the terminal 65 (USB terminal) described above, a protection circuit 66, a regulator 67, and an MCU (Micro Control Unit) 70. The charging adapter 60 also includes a constant current circuit 68, an abnormal voltage detection circuit 69, the jack 62 and detection switch 63 described above, and an LED lamp (Light Emitting Diode) 71.

A circuit constituted of the constant current circuit 68, the abnormal voltage detection circuit 69, and other electrical devices (resistor, switch device, etc. to be described later), that is, a charging circuit 72 enclosed by broken lines in FIG. 5 is prepared for two channels including the L channel and the R channel. Since the charging circuits 72 have substantially the same structure, the structure of the charging circuit 72 for the R channel and descriptions thereof will be omitted.

The protection circuit 66 is a circuit with respect to an abnormal input voltage from the terminal 65 side.

The regulator 67 adjusts an input voltage from the terminal 65 side (e.g., 5.0 V) to a predetermined voltage (e.g., 3.5 V).

The constant current circuit 68 generates and outputs constant currents set by resistors R2 and R3 connected to an output terminal and a set terminal, respectively.

A switch device S2 (P-MOS-FET) is provided on a line L1 connecting the regulator 67 and the constant current circuit 68, and a drain electrode of a switch device S1 (N-MOS-FET) is connected to a gate of the switch device S2. It should be noted that a gate voltage adjustment resistor R1 is connected between a gate electrode and source electrode of the switch device S2.

The source electrode of the switch device S2 is connected to a charge ON/OFF output terminal of the MCU 70. A switch operation of the switch device S2 is controlled by control voltage signals that are output from the MCU 70 via the charge ON/OFF output terminal and used for starting (ON) and stopping (OFF) charging processing. In addition, a switch operation of the switch device S1 is controlled based on the switch operation of the switch device S2.

A VDD terminal of the abnormal voltage detection circuit 69 is connected to a charging line L2 connecting the output sides of the resistors R2 and R3 and an L electrode 62L of the jack 62, and an output terminal of the abnormal voltage detection circuit 69 is connected to the charging line L2 via a resistor R5. The abnormal voltage detection circuit 69 is a circuit that detects an abnormal voltage in the charging line L2 and outputs a voltage signal indicating an anomaly when a voltage exceeding a threshold value is input to the VDD terminal, for example.

The MCU 70 acquires a voltage signal indicating an anomaly via a line L3 and an abnormal voltage detection input terminal.

A resistor R4 is connected to the charging line L2, and a drain electrode of a switch device S3 (N-MOS-FET) is connected to the resistor R4. By the abnormal voltage detection circuit 69 outputting a signal indicating an abnormal voltage in the charging line L2, the switch device S3 is turned on, and the voltage of the charging line L2 is lowered by the resistor R4.

To the charging line L2, a line L4 used for the MCU 70 to acquire a voltage value of the charging line L2 via a voltage read input terminal is connected. The MCU 70 converts the voltage value of the charging line L2 acquired via the voltage read input terminal into a digital value by an A/D converter and sets a charging time of the earphones 10 based on the digital value obtained by the conversion.

The detection switch 63 is connected to the MCU 70, and the MCU 70 detects that the plug 15 has been connected to the jack 62 as the detection switch 63 is turned on.

The MCU 70 varies a lighting state of the LED lamp 71 based on a current electrical state of the charging adapter 60 and notifies the user of that state.

[Circuit Structure of Earphones (To-Be-Charged Apparatus)]

Figure 6:
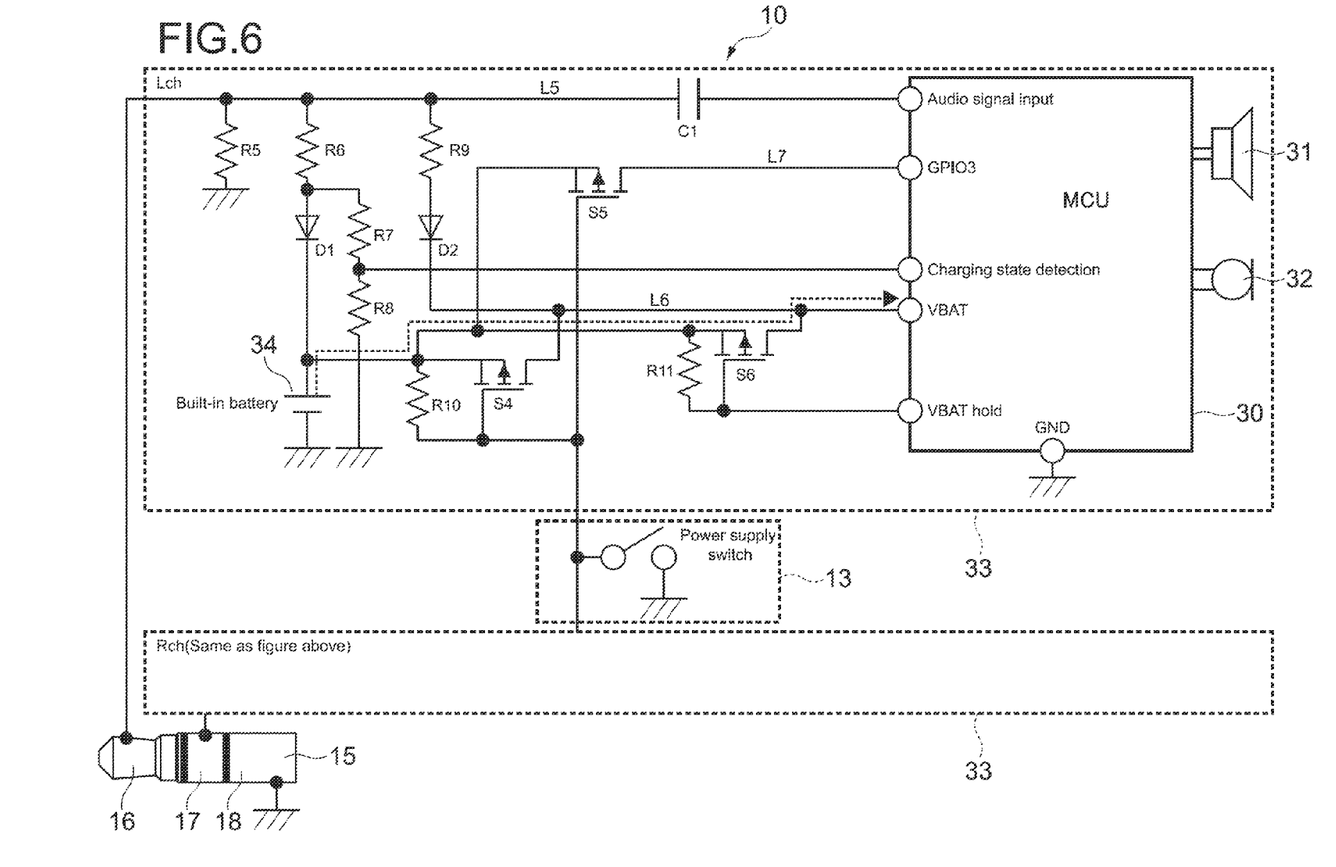
FIG. 6 is a diagram showing a circuit structure of an earphone body.

FIG. 6 is a diagram showing a circuit structure of the bodies 12 (L, R) of the earphones 10.

The earphones 10 include the plug 15, a pair of left and right body circuits 33 respectively connected to the L-channel electrode 16 and R-channel electrode 17 of the plug 15, and the power supply switch 13 connected to the body circuits 33. Since the earphones 10 include the pair of left and right bodies 12 (L, R) as described above and the body circuits 33 are substantially the same, an illustration of the body circuit 33 for the R channel will be omitted in FIG. 6, and descriptions thereof will also be omitted.

The body circuit 33 includes the MCU 30 on which the noise cancel circuit is mounted as described above. Connected to the MCU 30 are the speaker 31, the microphone 32, and an LED (Light Emitting Diode) lamp (not shown). The speaker 31 is of a BA (Balanced Armature) type, for example, though other speakers of well-known types may be used instead.

In the body circuit 33, a pull-down resistor R5 and a capacitor C1 that cuts a direct current are connected to a line L5 that is connected to the plug 15 and transmits audio signals (hereinafter, referred to as data line).

Further, on a line that is branched in parallel from the data line L5 (supply line), a built-in battery 34 is provided via a voltage adjustment resistor R6 and a backflow prevention diode D1. A rechargeable nickel hydride battery is used as the built-in battery 34, for example, though not limited thereto.

To the output side of the resistor R6, split resistors R7 and R8 used for the MCU 30 to detect a charging state based on a predetermined voltage value are connected. By acquiring a voltage between the resistors R7 and R8 during charging, the MCU 30 detects whether the current electrical state of the earphones 10 is a charging state. According to this state, the MCU 30 changes the lighting state of the LED lamp (not shown) and notifies the user of that state, for example.

To the data line L5, a VBAT line L6 connected to a VBAT terminal of the MCU 30 as an input terminal of a voltage of the built-in battery 34 is connected. On the VBAT line L6, a voltage adjustment resistor R9 and a backflow prevention diode D2 are provided.

The MCU 30 includes a VBAT hold terminal for holding a supply of a battery voltage to the VBAT terminal. A gate electrode of a switch device S6 (P-MOS-FET) is connected to the VBAT hold terminal, and a drain electrode thereof is connected to the VBAT line L6. Therefore, by outputting a control signal to the switch device S6 via the VBAT hold terminal, the MCU 30 holds the supply of the battery voltage to the VBAT terminal and also stops the supply of the battery voltage.

Gate voltage adjustment resistors R10 and R11 are connected to a switch device S4 (P-MOS-FET) and the switch device S6, respectively.

The MCU 30 includes a GPIO (General Purpose Input/Output)3 terminal 65, and the built-in battery 34 is connected to a GPIO line L7 connected to the GPIO3 terminal 65. On the GPIO line L7, a switch device S5 (P-MOS-FET) is provided.

The power supply switch 13 is connected to gate electrodes of the switch devices S4 and S5. The power supply switch 13 is constituted of, for example, a tact switch, and turns on the switch devices S4 and S5 when turned on. A source electrode of the switch device S4 is connected to the built-in battery 34, and a drain electrode thereof is connected to the VBAT line L6.

[Charging Operation of Electronic Apparatus]

A charging operation of the electronic apparatus set 100 structured as described above will be described.

(Processing of MCU of Charging Adapter During Charging)

Figure 7:
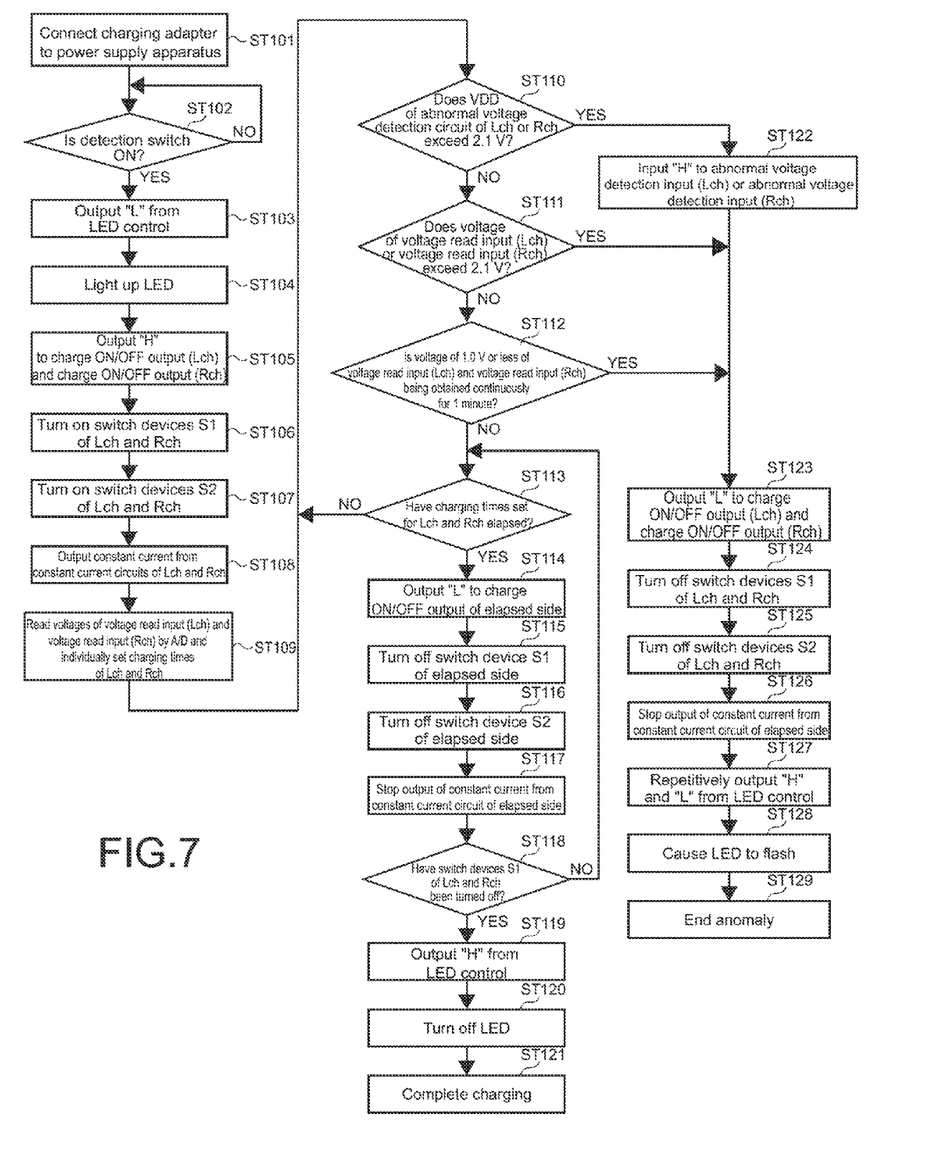
FIG. 7 is a flowchart mainly showing processing of an MCU (Micro Control Unit) of the charging adapter during charging.

FIG. 7 is a flowchart mainly showing processing of the MCU of the charging adapter 60 during charging. It should be noted that although both processing for the L and R channels are described in the blocks in the flowchart, descriptions will be given on one of the processing, and the processing for both channels will be described as necessary.

When charging is performed by the electronic apparatus set 100, the user connects the plug 15 of the earphones 10 to the jack 62 of the charging adapter 60 as shown in FIG. 1A and connects the terminal 65 of the charging adapter 60 to the terminal 201 of the power supply apparatus 200 (Step 101).

The MCU 70 of the charging adapter 60 judges whether the detection switch 63 is ON (Step 102) and when judged to be ON, outputs an "L" signal from an LED control (Step 103) to light up the LED lamp 71 (Step 104).

By the MCU 70 outputting an "H" signal from the charge ON/OFF output terminal (Step 105), the switch device S1 is turned on (Step 106). Accordingly, the switch device S2 is also turned on (Step 107). Then, the constant current circuit 68 outputs a constant current (Step 108).

The MCU 70 reads a voltage of the charging line L2 via the voltage read input terminal and sets a charging time based on the voltage value (Step 109). In this case, the charging time may differ depending on a remaining amount of charges of the built-in battery 34 of the L and R channels.

The MCU 70 reads an output signal from the abnormal voltage detection circuit 69 and judges whether the signal exceeds a threshold value (e.g., 2.1 V) (Step 110). When the signal is equal to or smaller than the threshold value, the MCU 70 judges whether the voltage input via the voltage read input terminal exceeds the threshold value (e.g., 2.1 V) (Step 111).

As described above, in Steps 110 and 111, an abnormal voltage detection by the abnormal voltage detection circuit 69, that is, hardware and abnormal voltage detection by the AD converter of the MCU 70, that is, software are performed. As a result, an abnormal voltage can be positively detected to thus enhance a safety.

In particular, even when the detection switch 63 is turned on by a connection of a plug of a product different from the earphones 10 of the present disclosure to the jack 62, an anomaly can be detected by the abnormal voltage detections of Steps 110 and 111. When an anomaly is detected, the MCU 70 executes processing of Step 122 and subsequent steps to be described later.

At least one of the abnormal voltage detection by the abnormal voltage detection circuit 69 and the abnormal voltage detection by the MCU 70 functions as a detection unit.

When judged NO in Step 112, that is, when the voltage of the charging line L2 is judged to be normal in the abnormal voltage detections by the hardware and software, the MCU 70 advances to Step 112 as the next step. In Step 112, the MCU 70 judges whether a predetermined low voltage (e.g., 1.0 V or less) that has been input via the voltage read input terminal is continuously obtained for a predetermined time (e.g., 1 minute) (Step 112). Also when a relatively-low voltage of 1.0 V or less is continuously obtained for a predetermined time, a possibility that a plug of a product different from the earphones 10 of the present disclosure is connected is high, and in such a case, the MCU 70 advances to processing of Step 123 to be described later.

When judged NO in Step 112 and the charging time set in Step 109 has elapsed (YES in Step 113), the MCU 70 outputs an "L" signal from the charge ON/OFF output terminal (Step 114). In Step 114, since the charging times may differ for the L and R channels as described above, the MCU 70 executes the processing separately.

The MCU 70 turns off the switch device S1 (Step 115) to also turn off the switch device S2 (Step 116), and thus the output of a constant current by the constant current circuit 68 stops (Step 117). When the switch devices S1 for both channels are turned off (YES in Step 118), the MCU 70 outputs an "H" signal from the LED control (Step 119). As a result, the LED lamp 71 is turned off (Step 120), and charging is completed (Step 121).

When judged YES in Step 110, an "H" signal is input to the MCU 70 via the abnormal voltage detection input terminal (Step 122). In this case, by outputting an "L" signal via the charge ON/OFF output terminal (Step 123), the MCU 70 turns off the switch device S1 (Step 124) to also turn off the switch device S2 (Step 125), and thus the output of a constant current from the constant current circuit 68 stops (Step 126).

By the MCU 70 alternately outputting the "H" and "L" signals from the LED control (Step 127), the LED lamp 71 flashes (Step 128), and the processing in the case of an anomaly ends (Step 129). By the flash of the LED lamp 71, the user is notified of an anomaly.

(Processing of Earphones During Charging)

Figure 8:
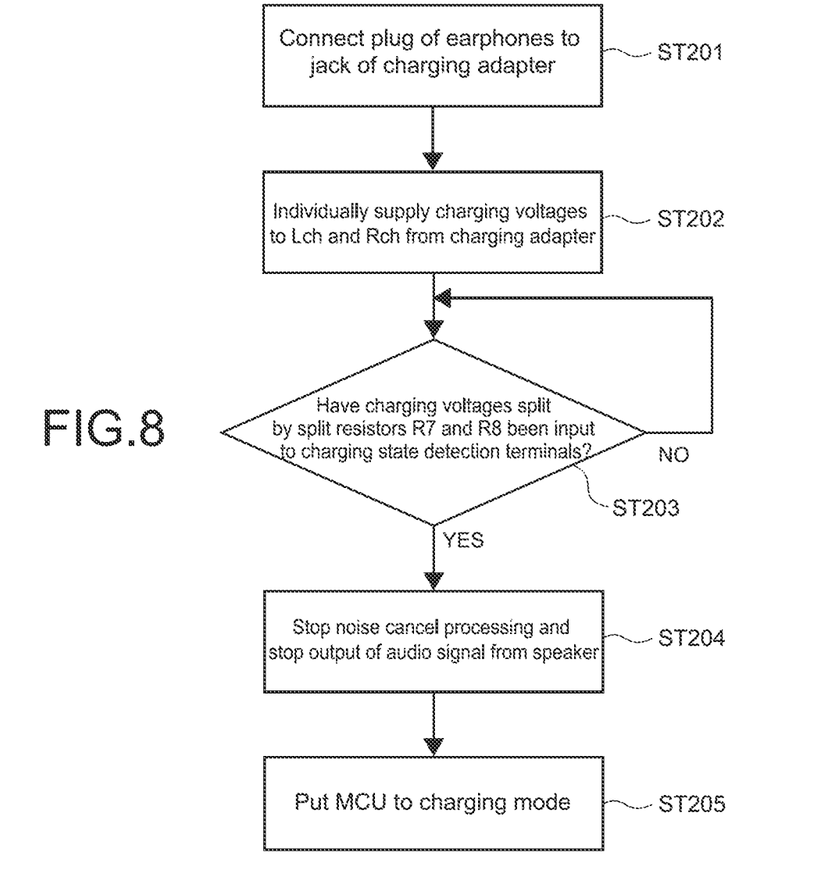
FIG. 8 is a flowchart showing processing of the earphones during charging.

FIG. 8 is a flowchart showing processing of the earphones during charging.

As described above, the user connects the plug 15 of the earphones 10 to the jack 62 of the charging adapter 60 and also connects the terminal 65 of the charging adapter 60 to the terminal 201 of the power supply apparatus 200 (Step 201). As a result, a charging voltage is supplied to the built-in battery 34 from the charging adapter 60 via the data line L5 and a line that is branched from the data line L5 (Step 202). When a predetermined charging voltage (charging voltage split by split resistors R7 and R8 (corresponding to resistance of 220 kΩ)) is input to the MCU 30 via a charging state detection terminal (Step 203), the MCU 30 stops the noise cancel processing during reproduction when audio is being reproduced and stops an audio output from the speaker 31, for example (Step 204). As a result, the MCU 30 is put to a charging mode (Step 205).

[Processing of Earphones at Normal Time]

Figure 9:
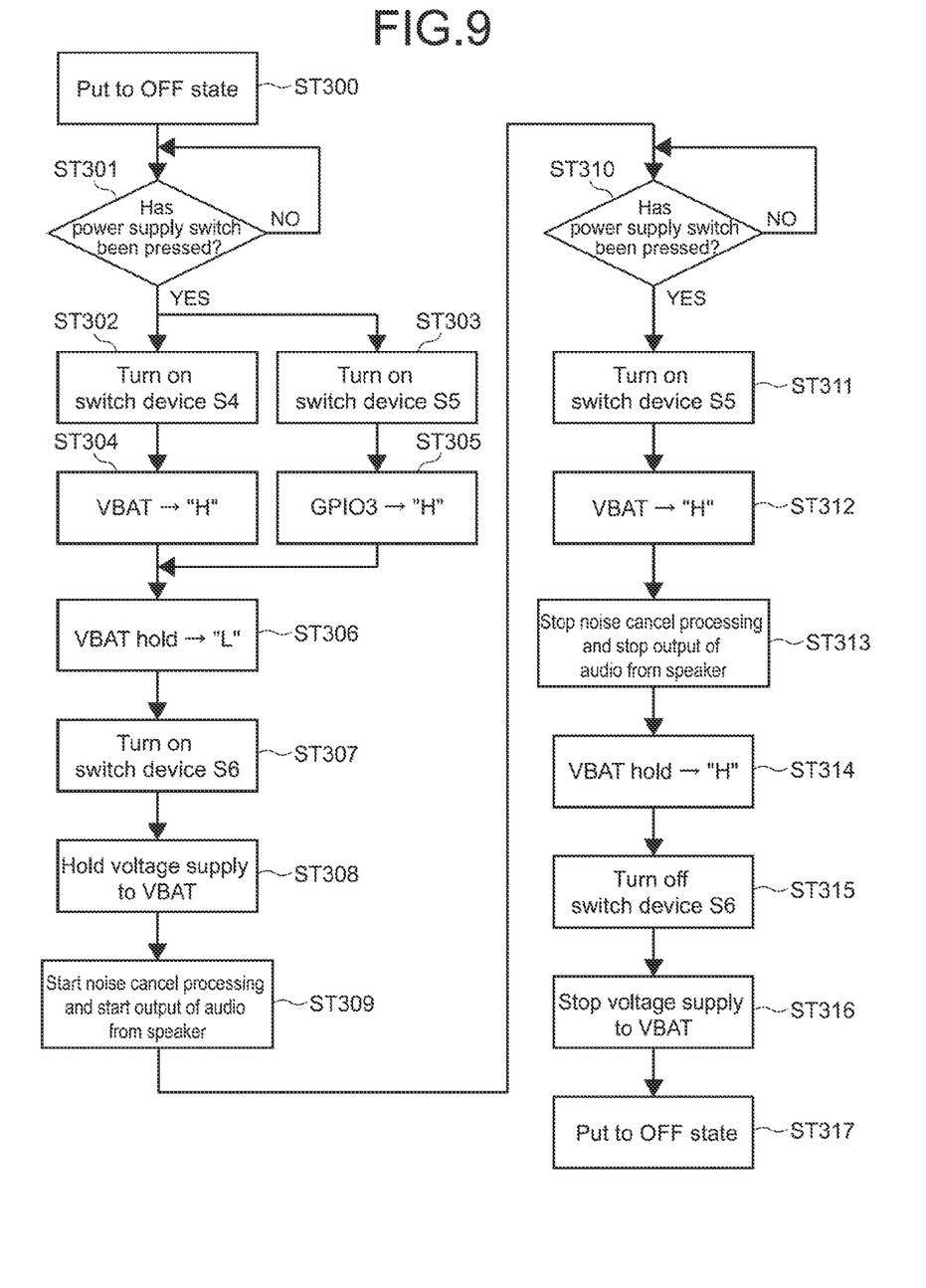
FIG. 9 is a flowchart showing processing of the earphones at a normal time during which charging is not performed.

FIG. 9 is a flowchart showing processing of the earphones at a normal time during which charging is not performed.

The user connects the plug 15 of the earphones 10 to the multimedia apparatus 300 as shown in FIG. 1B. When the earphones 10 are OFF (Step 300), the user presses the power supply switch 13 to turn it on (Step 301). Accordingly, the switch devices S4 and S5 are turned on (Steps 302 and 303), an "H" signal is input to the MCU 30 via the VBAT terminal (Step 304), and an "H" signal is input to the MCU 30 via the GPIO3 terminal 65 (Step 305). Then, the MCU 30 outputs an "L" signal via the VBAT hold terminal (Step 306).

Since the power supply switch 13 is a tact switch, when the user releases the press of the power supply switch 13 after the power supply switch 13 is turned on, the power supply switch 13 is turned off. As a result, the switch devices S4 and S5 are turned off.

By outputting the "L" signal from the VBAT hold terminal, the switch device S6 is turned on (Step 307). Accordingly, a voltage supply from the built-in battery 34 to the VBAT terminal is held as indicated by the arrow in broken lines in FIG. 6 (Step 308). Then, the MCU 30 starts the noise cancel processing and starts outputting audio from the speaker 31 (Step 309). At this time, audio signals from the multimedia apparatus 300 are input to the MCU 30 via the data line L5.

When the power supply switch 13 is pressed by the user and turned on again (Step 310), the switch device S5 is turned on (Step 311), and an "H" signal is input to the MCU 30 via the VBAT terminal (Step 312). Accordingly, the MCU 30 stops the noise cancel processing and stops outputting audio from the speaker 31 (Step 313).

Moreover, the MCU 30 outputs an "H" signal via the VBAT hold terminal (Step 314) to turn off the switch device S6 (Step 315), and thus the voltage supply from the built-in battery 34 to the VBAT terminal is stopped (Step 316). Accordingly, the earphones 10 are put to an OFF state (Step 317).

It should be noted that in Step 309, the MCU 30 merely executes processing to "enable" audio to be output from the speaker 31. In other words, the processing of reproducing audio data and stopping the reproduction are carried out by input operations to the multimedia apparatus 300 by the user.

As described above, according to the earphones 10 of this embodiment, since the circuit that supplies charges from the charging adapter 60 to the built-in battery 34 using the data line L5 is provided, the number of equipment requisite for charging can be reduced as compared to general products of the related art.

In earphones and headphones of the related art that are equipped with a noise cancel circuit, charging has been performed using a charge-only code different from a line for transmitting audio data. However, according to the present disclosure, the charge-only code becomes unnecessary.

Moreover, since the built-in battery 34 is provided inside the bodies 12 (L, R) of the earphones 10 in this embodiment, the size of the earphones 10 can be made smaller than that of the earphones of the related art. A battery box of the earphones of the related art has been connected to a body with a code while being physically apart from the body.

Other Embodiments

The present disclosure is not limited to the embodiments above, and various other embodiments can be realized.

The plug housing 21 of the plug unit 20 of the above embodiment has been formed such that the upper surface 25a and the lower surface 25b become planar. However, only one of the upper and lower surfaces may be formed to be planar. Alternatively, it is possible to form both the upper and lower surfaces in a curve so that the plug housing is formed in an oval shape when seen in the axial direction of the plug housing.

Alternatively, a convex portion capable of being brought into contact with the protrusion 63a of the detection switch 63 may be provided on one of the upper and lower surfaces of the plug housing.

The embodiment above has taken the earphones 10 as an example of the to-be-charged apparatus. However, headphones, an acoustic aid, or the like may be used instead. In a case where an acoustic aid is used as the to-be-charged apparatus, the speaker 31, the circuit, and the like for one channel only need to be provided. Alternatively, the to-be-charged apparatus may be a multimedia apparatus including a cellular phone, or the like.

The to-be-charged apparatus has included the built-in battery 34. However, it is also possible to use earphones 10 that include a mounting unit so that an exchangeable rechargeable external battery can be mounted to the mounting unit.

The earphones 10 have included the noise cancel circuit as a part of the drive unit. However, the earphones 10 (or headphones) may include, in place of or in addition to the noise cancel circuit, an infrared communication circuit such as Bluetooth as a part of the drive unit.

At least two of the feature portions of the embodiments above can be combined.

The present disclosure may also take the following structures.

(1) A to-be-charged apparatus, including:
 a built-in battery;
 a plug connectable to a jack included in a data storage apparatus capable of storing data and a jack included in a charging adapter;
 a drive unit that is capable of acquiring the data from the data storage apparatus while the plug is connected to the jack of the data storage apparatus and is driven by power supplied from the built-in battery; and
 a circuit that includes a data line for transmitting the data, which is connected between the plug and the drive unit, and supplies, when a connection of the plug to the jack of the charging adapter is detected by a detection switch included in the charging adapter connected to a power supply apparatus, a charge from the charging adapter to the built-in battery using the data line.

(2) The to-be-charged apparatus according to (1),
 in which the plug is a 3-prong plug including a common electrode.

(3) The to-be-charged apparatus according to (1) or (2),
 in which the drive unit includes a speaker and a noise cancel circuit connected to the speaker.

(4) The to-be-charged apparatus according to any one of (1) to (3), further including
 a plug housing that includes a portion that mechanically makes a switch by the detection switch of the charging adapter and holds the plug.

(5) The to-be-charged apparatus according to any one of (1) to (4),
 in which the circuit includes a capacitor provided on the data line, a charge supply line that is branched from the data line and connected to the built-in battery, and a diode provided on the charge supply line.

(6) A charging adapter that is connectable to a to-be-charged apparatus including a built-in battery, a plug, and a data line for transmitting data stored in a data storage apparatus connected to the plug and to a power supply apparatus and charges the to-be-charged apparatus, the charging adapter including:
 a terminal connectable to the power supply apparatus;
 a jack connectable to the plug of the to-be-charged apparatus;
 a detection switch configured to detect that the plug of the to-be-charged apparatus has been connected to the jack; and
 a charging circuit that is connected to the terminal, the jack, and the detection switch and charges the built-in battery using the data line of the to-be-charged apparatus when the terminal is connected to the power supply apparatus and a connection of the plug to the jack is detected by the detection switch.

(7) The charging adapter according to (6),
 in which the charging circuit includes a charging line connected between the terminal and the jack and a detection unit that detects a normality and an anomaly of a voltage of the charging line.

(8) The charging adapter according to (6) or (7),
 in which the detection switch includes a portion that mechanically makes a switch by a plug housing that is included in the to-be-charged apparatus and supports the plug.

(9) An electronic apparatus set, including:
 a charging adapter connectable to a power supply apparatus; and
 a to-be-charged apparatus connectable to the charging adapter and a data storage apparatus capable of storing data,
 the to-be-charged apparatus including
 a built-in battery,
 a plug connectable to a jack included in the data storage apparatus and a jack included in the charging adapter,
 a drive unit that is capable of acquiring the data from the data storage apparatus while the plug is connected to the jack of the data storage apparatus and is driven by power supplied from the built-in battery, and
 a circuit that includes a data line for transmitting the data, which is connected between the plug and the drive unit, and is connected to the built-in battery,
 the charging adapter including
 a terminal connectable to the power supply apparatus,
 the jack,
 a detection switch that detects that the plug of the to-be-charged apparatus has been connected to the jack of the charging adapter, and
 a charging circuit that is connected to the terminal, the jack, and the detection switch and charges the built-in battery using the data line of the to-be-charged apparatus when the terminal is connected to the power supply apparatus and a connection of the plug to the jack is detected by the detection switch.

(10) A plug unit for a to-be-charged apparatus including a built-in battery, a data line for transmitting data from a data storage apparatus capable of storing the data, and a drive unit that is connected to the data line, is capable of acquiring the data from the data storage apparatus via the data line, and is driven by power supplied from the built-in battery, the plug unit including:

a plug that is connectable to a jack included in the data storage apparatus and a jack included in a charging adapter and is connected to the data line; and a plug housing that supports the plug and includes a portion that mechanically makes a switch by a detection switch that is included in the charging adapter connected to a power supply apparatus and detects a connection of the plug to the jack.

(11) A to-be-charged apparatus, including:

a mounting unit to which an external battery is mounted;

a plug connectable to a jack included in a data storage apparatus capable of storing data and a jack included in a charging adapter;

a drive unit that is capable of acquiring the data from the data storage apparatus while the plug is connected to the jack of the data storage apparatus and is driven by power supplied from the external battery; and a circuit that includes a data line for transmitting the data, which is connected between the plug and the drive unit, and supplies, when a connection of the plug to the jack of the charging adapter is detected by a detection switch included in the charging adapter connected to a power supply apparatus, a charge from the charging adapter to the external battery using the data line.

(12) A charging adapter that is connectable to a to-be-charged apparatus including a mounting unit to which an external battery is mounted, a plug, and a data line for transmitting data stored in a data storage apparatus connected to the plug and to a power supply apparatus and charges the to-be-charged apparatus, the charging adapter including:

a terminal connectable to the power supply apparatus;

a jack connectable to the plug of the to-be-charged apparatus;

a detection switch configured to detect that the plug of the to-be-charged apparatus has been connected to the jack; and a charging circuit that is connected to the terminal, the jack, and the detection switch and charges the external battery using the data line of the to-be-charged apparatus when the terminal is connected to the power supply apparatus and a connection of the plug to the jack is detected by the detection switch.

The present disclosure contains subject matter related to that disclosed in Japanese Priority Patent Application JP 2011-191791 filed in the Japan Patent Office on Sep. 2, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A to-be-charged apparatus, comprising:
a built-in battery;
a plug connectable to a jack included in a data storage apparatus capable of storing data, wherein the same plug is directly connectable to a jack included in a charging adapter;
a drive unit that is capable of acquiring the data from the data storage apparatus while the plug is connected to the jack of the data storage apparatus and is driven by power supplied from the built-in battery; and
a circuit that includes a data line for transmitting the data, which is connected between the plug and the drive unit, and supplies, when a connection of the plug to the jack of the charging adapter is detected by a detection switch included in the charging adapter connected to a power supply apparatus, a charge from the charging adapter to the built-in battery using the data line.

2. The to-be-charged apparatus according to claim 1, wherein the plug is a 3-prong plug including a common electrode.

3. The to-be-charged apparatus according to claim 1, wherein the drive unit includes a speaker and a noise cancel circuit connected to the speaker.

4. The to-be-charged apparatus according to claim 1, further comprising a plug housing that includes a portion that mechanically makes a switch by the detection switch of the charging adapter and holds the plug.

5. The to-be-charged apparatus according to claim 1, wherein the circuit includes a capacitor provided on the data line, a charge supply line that is branched from the data line and connected to the built-in battery, and a diode provided on the charge supply line.

6. The to-be-charged apparatus according to claim 1, wherein the to-be-charged apparatus is a communication device.

7. A charging adapter that is connectable to a to-be-charged apparatus including a built-in battery, a plug, and a data line for transmitting data stored in a data storage apparatus connected to the plug and to a power supply apparatus and charges the to-be-charged apparatus, the charging adapter comprising:
a terminal connectable to the power supply apparatus;
a jack connectable to the plug of the to-be-charged apparatus, wherein the plug of the to-be-charged apparatus is connectable to the jack included in the charging adapter, and wherein the same plug of the to-be-charged apparatus is directly connectable to a jack included in a data storage apparatus capable of storing data;
a detection switch configured to detect that the plug of the to-be-charged apparatus has been connected to the jack of the charging adapter; and
a charging circuit that is connected to the terminal, the jack of the charging adapter, and the detection switch and charges the built-in battery using the data line of the to-be-charged apparatus when the terminal is connected to the power supply apparatus and a connection of the plug to the jack of the charging adapter is detected by the detection switch.

8. The charging adapter according to claim 7, wherein the charging circuit includes a charging line connected between the terminal and the jack of the charging adapter and a detection unit that detects a normality and an anomaly of a voltage of the charging line.

9. The charging adapter according to claim 7, wherein the detection switch includes a portion that mechanically makes a switch by a plug housing that is included in the to-be-charged apparatus and supports the plug.

10. The charging adapter according to claim 7, wherein the charging circuit includes a charging line connected between the terminal and the jack of the charging adapter and a detection unit that detects an anomaly of a voltage of the charging line when a product different from the to-be-charged apparatus is connected to the charging adapter.

11. The charging adapter according to claim 7, wherein the charging circuit includes a charging line connected between the terminal and the jack of the charging adapter and a detection unit that detects an anomaly of a voltage of the charging line when a voltage of the charging line exceeds a predetermined threshold.

12. An electronic apparatus set, comprising:
a charging adapter connectable to a power supply apparatus; and
a to-be-charged apparatus connectable to the charging adapter and a data storage apparatus capable of storing data,
the to-be-charged apparatus including
a built-in battery,
a plug directly connectable to a jack included in the data storage apparatus, wherein the same plug is directly connectable to a jack included in the charging adapter,
a drive unit that is capable of acquiring the data from the data storage apparatus while the plug is directly connected to the jack of the data storage apparatus and is driven by power supplied from the built-in battery, and
a circuit that includes a data line for transmitting the data, which is connected between the plug and the drive unit, and is connected to the built-in battery,
the charging adapter including
a terminal connectable to the power supply apparatus,
the jack,
a detection switch that detects that the plug of the to-be-charged apparatus has been connected to the jack of the charging adapter, and
a charging circuit that is connected to the terminal, the jack of the charging adapter, and the detection switch and charges the built-in battery using the data line of the to-be-charged apparatus when the terminal is connected to the power supply apparatus and a connection of the plug to the jack of the charging adapter is detected by the detection switch.

13. A plug unit for a to-be-charged apparatus including a built-in battery, a data line for transmitting data from a data storage apparatus capable of storing the data, and a drive unit that is connected to the data line, is capable of acquiring the data from the data storage apparatus via the data line, and is driven by power supplied from the built-in battery, the plug unit comprising:
a plug that is directly connectable to a jack included in the data storage apparatus, wherein the same plug is directly connectable to a jack included in a charging adapter and is connected to the data line; and
a plug housing that supports the plug and includes a portion that mechanically makes a switch by a detection switch that is included in the charging adapter connected to a power supply apparatus and detects a connection of the plug to the jack of the charging adapter.

14. A to-be-charged apparatus, comprising:
a mounting unit to which an external battery is mounted;
a plug connectable to a jack included in a data storage apparatus capable of storing data, wherein the same plug is directly connectable to a jack included in a charging adapter;
a drive unit that is capable of acquiring the data from the data storage apparatus while the plug is connected to the jack of the data storage apparatus and is driven by power supplied from the external battery; and
a circuit that includes a data line for transmitting the data, which is connected between the plug and the drive unit, and supplies, when a connection of the plug to the jack of the charging adapter is detected by a detection switch included in the charging adapter connected to a power supply apparatus, a charge from the charging adapter to the external battery using the data line.

15. A charging adapter that is connectable to a to-be-charged apparatus including a mounting unit to which an external battery is mounted, a plug, and a data line for transmitting data stored in a data storage apparatus connected to the plug and to a power supply apparatus and charges the to-be-charged apparatus, the charging adapter comprising:
a terminal connectable to the power supply apparatus;
a jack connectable to the plug of the to-be-charged apparatus, wherein the plug of the to-be-charged apparatus is connectable to the jack included in the charging adapter, and wherein the same plug of the to-be-charged apparatus is directly connectable to a jack included in a data storage apparatus capable of storing data;
a detection switch configured to detect that the plug of the to-be-charged apparatus has been connected to the jack of the charging adapter; and
a charging circuit that is connected to the terminal, the jack of the charging adapter, and the detection switch and charges the external battery using the data line of the to-be-charged apparatus when the terminal is connected to the power supply apparatus and a connection of the plug to the jack of the charging adapter is detected by the detection switch.

* * * * *